(12) United States Patent  (10) Patent No.: US 8,332,865 B2
Schmidbauer et al.  (45) Date of Patent: Dec. 11, 2012

(54) ADJUNCT PROCESSOR LOAD BALANCING

(75) Inventors: Joerg Schmidbauer, Herrenberg (DE); Klaus Werner, Moetzingen (DE)

(73) Assignee: International Business Machines Corporation, Armonk, NY (US)

( * ) Notice: Subject to any disclaimer, the term of this patent is extended or adjusted under 35 U.S.C. 154(b) by 987 days.

(21) Appl. No.: 12/362,912

(22) Filed: Jan. 30, 2009

(65) Prior Publication Data

US 2009/0217286 A1  Aug. 27, 2009

(30) Foreign Application Priority Data

Feb. 21, 2008  (EP) .................................... 08151722

(51) Int. Cl.
*G06F 9/50* (2006.01)
(52) U.S. Cl. ........................ 718/106; 718/105
(58) Field of Classification Search .................. None
See application file for complete search history.

(56) References Cited

U.S. PATENT DOCUMENTS

| | | | | |
|---|---|---|---|---|
| 5,581,777 | A * | 12/1996 | Kim et al. ...................... | 712/16 |
| 7,051,188 | B1 | 5/2006 | Kubala et al. | |
| 7,865,899 | B2 * | 1/2011 | Kawamoto et al. ............ | 718/105 |
| 8,078,824 | B2 * | 12/2011 | Sugumar et al. ............... | 711/170 |
| 2006/0280119 | A1 * | 12/2006 | Karamanolis et al. ......... | 370/229 |
| 2008/0028410 | A1 * | 1/2008 | Cherkasova et al. ........... | 718/104 |

OTHER PUBLICATIONS

Bajaj etal. Improving Scheduling of Tasks in a Heterogeneous Environment, 2004, IEEE transactions on parallel Distributed systems vol. 15, No. 2. pp. 107-118.*
Becker etal., Towards Data Partitioning for Parallel Computing on Three Interconnected Clusters, 2007, IEEE, 8 pages.*
Da Silva etal., Trading Cycles for Information: Using Replication to Schedule Bag-of-Tasks Applications on Computational Grids, 2003, Springer-Verlag, 12 pages.*
DeWitt etal, Practical Skew Handling in Parallel Joins, 1992, Proc. of the 18th VLDB conf. Vancouver, British Columbia, Canada.*
Yang, Chao-Tung, A Parallel Loop Self-Scheduing on Extermely Heterogeneous PC clusters, 2003, Springer-Verlag, p. 1079-1088.*
Khan, Mohammad S., A Standardized Interface Control Unit for Heterogeneous Digital Signal Processors, 1994, IEEE, 5 pages.*

* cited by examiner

*Primary Examiner* — Eric Coleman
(74) *Attorney, Agent, or Firm* — Steven Chiu

(57) ABSTRACT

Managing the workload across one or more partitions of a plurality of partitions of a computing environment. One or more processors are identified in a partition to be managed by a quality weight defined according to characteristics of each corresponding processor. A load of each identified processor is measured depending on the requests already allocated to be processed by each corresponding processor. Each identified processor has a performance factor determined based on the measured load and the quality weight. The performance factor is a measurement of processor load. A new request is identified to be allocated to the partition, selecting a processor from the partition with the lowest performance factor. The new request is allocated to the selected processor.

17 Claims, 2 Drawing Sheets

ADJUNCT PROCESSOR LOAD BALANCING

FIELD OF THE INVENTION

The present invention relates to a method of managing workload of a computing environment across two or more partitions wherein a partition has one or more processors allocated thereto. Furthermore, it is related to a computer program product comprising a computer useable medium comprising codes to be executed on a computer environment, while the codes from the computer usable medium when executed, manages workload across the partitions of that computer environment. It is also related to a computing environment comprising a computer readable medium with codes when executed, manages workload across the partitions of that computer environment.

BACKGROUND

Logical partitioning (LPAR) allows the establishment of a plurality of system images within a single physical machine or central processor complex. Each system image is capable of operating as if it was a separate computer system. That is, each logical partition can be independently reset, initially loaded with an operating system that may be different for each logical partition, and operate with different software programs using different input/output (I/O) devices. One important aspect of a logically partitioned system is the management of workload running within the partitions of that system. In some commercial embodiments of logically partitioned systems, the workload managers attempt to balance the workload of the partitions by moving work to the physical resources of the system. In order to move the work, however, it is important to ensure that the data needed by the relocated work is at the moved location. This need often restricts the movement of work.

U.S. Pat. No. 7,051,188, incorporated herein by reference, describes allocation of shareable resources of a computing environment dynamically adjusted to balance the workload of that environment. Workload is managed across two or more partitions of a plurality of partitions of the computing environment. The managing includes dynamically adjusting allocation of a shareable resource of at least one partition of the two or more partitions in order to balance workload goals of the two or more partitions.

On the IBM System z platform, cryptographic operations are initiated by Operating Systems running in LPARs ("processors") and are executed by crypto devices ("resources"), such as Peripheral Component Interconnect Cryptographic Card (PCICC), PCI—Cryptographic Accelerator (PCICA), PCI—Extended Cryptographic Card (PCIXCC), or Crypto Express2. A Crypto Express2 feature consists of two cards, which can be configured in either coprocessor or accelerator mode. Each card or crypto device has a unique Adjunct Processor (AP) number or ID, which is used for accessing the card's functionality. Multiple crypto devices can be assigned to a particular LPAR via the machine's Support Element. To process a given crypto request, the operating system has to choose one crypto device out of all assigned crypto devices of this LPAR.

z/VSE and Linux on System z have routines to choose the crypto device for the current request. This routine checks all device indices and determines whether a crypto device is available and online. It then reads the current caller count (within this partition) of the devices and returns the index of the device with the lowest caller count. In addition to that, the routine prefers "faster" devices. This algorithm is sub-optimal because the routine only checks the workload within its own LPAR and there is no means to estimate the duration of requests being processed by a particular AP.

As crypto devices are usually shared across LPARs, a single Operating System cannot determine the optimal device for a given crypto operation because it has no information about currently processed crypto requests submitted from Operating Systems in other LPARs.

BRIEF SUMMARY

In view of the above, it is an object of the present invention to provide an optimized workload manager for selecting the best resource out of multiple for a particular operation initiated by a given processor.

This object is achieved in accordance with the invention by applying a method of managing workload across two or more partitions of a plurality of partitions of a computing environment, wherein a partition has one or more processors allocated thereto. The method comprises the step of identifying the different processors to be managed by a quality weight defined according to their characteristics. The load of the different processors are measured depending on the requests already allocated to be processed by the different processors and affecting (applying) to each processor a performance factor defined by (based on) the measured load and the quality weight. When a new request is identified to be allocated within a partition, then the performance factor of the different processors from that partition are analyzed and accordingly the new request is allocated to the processor within that partition with the best performance factor taking into account its individual static weight to minimize the time to process that request.

In some alternative according to the invention, is affected to the new identified request to be allocated within a partition an individual static weight corresponding to an estimate amount of processor time required to be processed. The quality weight is usually defined depending on the processor speed.

In a preferred embodiment according to the invention, a processor flag and a request flag are associated respectively to the quality weight affected to each processor and to the identified request. Such flags are defined accordingly to the specificity of the processor and the request such that the allocation of the new request to a processor is performed by checking first the compatibility according to predefined rules of both request and processor flags.

Furthermore, the method comprises also the step when measuring the load for the different processors to take into account a specific static weight for request. Such static weight expresses the operation time of the corresponding processor required to fulfill the already allocated requests. And this static weight is advantageously taken into account when estimating in a more precise way the time the different processors are already busy with processing the allocated requests. Not only is the number of requests summed up but also their quality so to optimize the workload management.

The invention further relates to a computer program product comprising a computer useable medium with codes to be executed on the computing environment with at least two or more partitions, their workload to be managed. The codes when executed managed workload across those partitions by applying several steps comprising an identification of the different processors allocated to the partitions. Such identification is performed by affecting to them a quality weight defined according to their characteristics. Also is measured the actual load of the different processors according to all the request or operations already allocated to be processed by the different processors. Both quality weight and measured load are put together to define a performance factor of the respective processors. Furthermore, the codes perform an identification of a new request to be allocated. And the allocation of that new request is performed according to an analysis of the performance factors of the different processors such to dedicate the request to the processor with the best performance factor to minimizing the time to be processed. For the allocation can be advantageously taken into account an individual static weight to be affected to the new identified request and expressing an estimation of the amount of processor time required to be processed.

In a preferred alternative embodiment, the computer program product comprises codes which associate to the quality weight affected to each processor and to the identified request respectively a processor flag and a request flag defined according to the specificity of the processor and the request. Such flags are used for the allocation of the new request by checking first the compatibility of its flag with the one of the processor to which it is allocated. Such compatibility follows predefined rules expressing the condition that some of the requests can be processed or operated only on some of the processors. Also some specific static weight can be taken into account when the load of the different processors is measured to estimate in a more accurate way the amount of central processor unit.

Advantageously, the codes within the computer usable medium providing a workload management are implemented as firmware within the computing environment. Hereby, the term firmware denotes software closely related to the hardware of the computing environment, such as z Firmware for IBM mainframe computers, the BIOS (Basic Input Output System) for Personal Computers, or even device drivers, which handle access to devices from multiple virtualized processors.

An alternative embodiment according to the invention consists of a computing environment comprising a plurality of partitions with each having one or more processors allocated thereto and a computer readable medium. The latter comprises codes when executed manage workload across two or more partitions according to the preceding embodiments.

Advantageous developments of the invention are described in the dependent claims, the following description and the drawings.

BRIEF DESCRIPTION OF THE SEVERAL VIEWS OF THE DRAWINGS

An exemplary embodiment of the invention will now be explained further with reference to the attached drawings in which.

DETAILED DESCRIPTION

Figure 1:
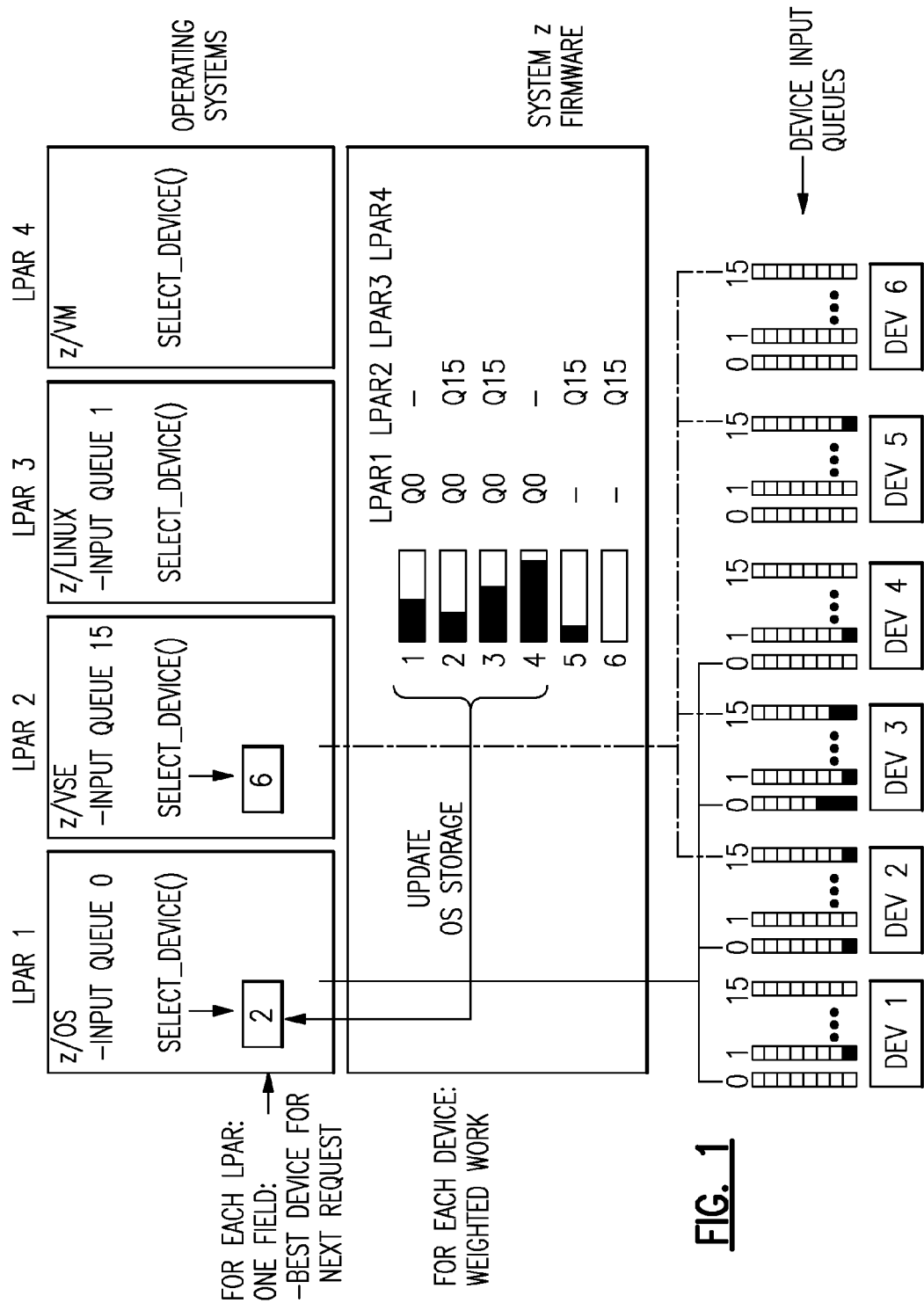
FIG. 1 illustrates one example of a computing environment according to the invention.

The present invention provides an optimized method for selecting the best resource (out of multiple) for a particular operation initiated by a given processor or adjunct processor (AP). This allows for load balancing as well as for best performance. It is applicable in general for systems which virtualize processors and resources, i.e. IBM System z, but also on any other platforms, like Intel with VMWARE, Microsoft Virtual PC, etc.

The new method of managing workload ("AP balancing") of a computing environment with processors like adjunct processor uses additional information provided usually by some firmware like System z Firmware. The major elements used to implement the present invention are as follow:

AP Group: An AP group is the set of APs assigned to a specific LPAR. The operating system selects the device for a given request within this group.

AP Weight: A weighted value for each AP expressing a performance factor and calculated by summing up the number of currently processed requests in the AP queues (crypto domains). Preferably, also taken into account is an individual static weight value of each request corresponding to an estimate amount of processor time required to be processed. This shall reflect the fact that some requests (e.g. key generations) require much more time to process than others (e.g. RSA-1024 MEX or CRT).

calculation of an AP weight $$AP\_weight = \sum_{i=0 \ldots n} \left( \sum_{k=0 \ldots m} (req\_weight_{i,k}) \right) \quad \text{Equation 1}$$

The above formula calculates the weighted sum of the up to m requests in all n AP queues of a given AP. The above performed sum is taken as a measurement of the current AP load.

Table 1 shows an example of requests with their weights. In this example a CEX2A is considered to be 3 times faster than a CEX2C for RSA acceleration i.e. for public-key cryptography, a PCIXCC half as fast as a CEX2C. A CRT function needs more time than a MEX function. However, exact values should advantageously be determined by performance tests.

TABLE 1 weights of AP functions in relation to crypto devices (examples)

| Request | Crypto Device | Request Weight |
|---|---|---|
| RSA-1024 MEX | PCICC | 36 |
| RSA-1024 MEX | PCICA | 8 |
| RSA-1024 MEX (encrypt) | PCIXCC | 24 |
| RSA-1024 MEX | CEX2C | 12 |
| RSA-1024 MEX | CEX2A | 4 |
| RSA-1024 CRT (decrypt) | PCICC | |
| RSA-1024 CRT | PCICA | |
| RSA-1024 CRT | PCIXCC | |
| RSA-1024 CRT | CEX2C | |
| RSA-1024 CRT | CEX2A | |
| RSA-2048 MEX (encrypt) | PCICA | 16 |
| RSA-2048 CRT (decrypt) | PCICA | 24 |
| RSA-2048 MEX (encrypt) | CEX2C | 24 |
| RSA-2048 CRT (decrypt) | CEX2C | 36 |
| RSA-4096 MEX (encrypt) | CEX2A | 40 |
| RSA-4096 CRT (decrypt) | CEX2A | 60 |
| RSA-1024 Key Generation | PCICC | 800 |
| RSA-1024 Key Generation | PCIXCC | 400 |
| RSA-1024 Key Generation | CEX2C | 200 |
| RSA-2048 Key Generation | CEX2C | 600 |
| PIN create | CEX2C | ? |
| PIN verify | CEX2C | ? |

The best possible AP for a given request is the AP with the lowest weight within an AP group. Because some requests can only be performed by a coprocessor (e.g. key generations, secure key operations, etc.), it is preferable in some situations to differentiate between a "best coprocessor AP" and a "best accelerator AP". This can be obtained by associating to the quality weight affected to each processor and to the identified request respectively a processor flag and a request flag defined according to the specificity of the processor and the request. Those flags are used such that the allocation of the new request to a processor is performed by checking first the compatibility according to predefined rules of both request and processor flags.

One of the main differences to already known approaches is related to the additional information usually accessible only to the virtualization layer (in the present example z Firmware). According to the present invention, such information is provided to the workload manager to help for selecting the best device (processor or AP) for a given request. The applied method of managing workload determines the optimal device for the next request while the previous request is being processed. The Operating System running in a logical partition (LPAR) just takes the result (usually provided as aggregated information) of this processing without any overhead.

As operating systems may provide a function to enable and disable an AP from the OS point of view, i.e. the AP is still online from the Service Element's point of view, the determined best AP may be possibly not usable. To handle this situation accordingly, an ordered list of APs could be maintained. However, disabling an AP via the OS will then make sense temporarily before toggling OFF the AP via the Service Element to ensure that pending replies are not discarded.

FIG. 1 shows a scenario with only one single type of device i.e. Dev 1, Dev 2, . . . Dev. 6 are processors or AP of the same type. To each of those devices are allocated 16 device input queues (n=16) indexed 0 to 15 with each 8 small boxes (m=8) corresponding to kind of buffers where the already allocated requests are queued before being processed by the respective device. The limit for the queue of each processor to 8 as well as the consideration of 16 AP are values chosen as example and shall not be considered as a limitation. Each of those queues is allocated to a different logical partitioning LPAR 1 till LPAR 16 while only the first four are shown on FIG. 1. For example, any request coming from LPAR 1 to be processed can be allocated to Dev. 1, Dev. 2, Dev. 3 and Dev. 4 (see full line) while the one coming from LPAR 2 can be allocated to Dev. 2, Dev. 3, Dev. 5 and Dev. 6 (see dot and dash line).

On the example shown on FIG. 1, a single request is already allocated to Dev. 1, 2 to Dev. 2, 6 to Dev. 3 and 1 to Dev. 4 and 5 (depicted by the small boxes shaded) while nil to Dev. 6. Hence, the best device for LPAR1 is device number 2, because it has the lowest weight within the group of devices assigned to LPAR1 (device numbers 1, 2, 3, and 4). LPAR2 would use device number 6 for the next request, because device number 6 has the lowest weight within the devices accessible by LPAR2 (devices 2, 3, 5, and 6).

The algorithm can easily be applied to a scenario with two or more different device types, where some requests can only be processed on one device type. In this case, it is an advantage but not mandatory to introduce some processor and request flags as described above. The following section describes a scenario with two device types which are two cryptographic devices performing operations, like RSA encrypt or RSA decrypt.

With each crypto request coming from an operating system, the firmware (here z Firmware) updates some additional fields which are not accessible by/not relevant for the OS.

Whenever a request is sent to a particular AP, its new weight value is calculated from the type of request and its corresponding weight value. Adding a weight value must be an atomic update.

Whenever a request has been processed, the new weight value of this AP is recalculated.

Only the two fields showing the weight values for the best accelerator and the best coprocessor AP are accessible by the OS.

Figure 2:
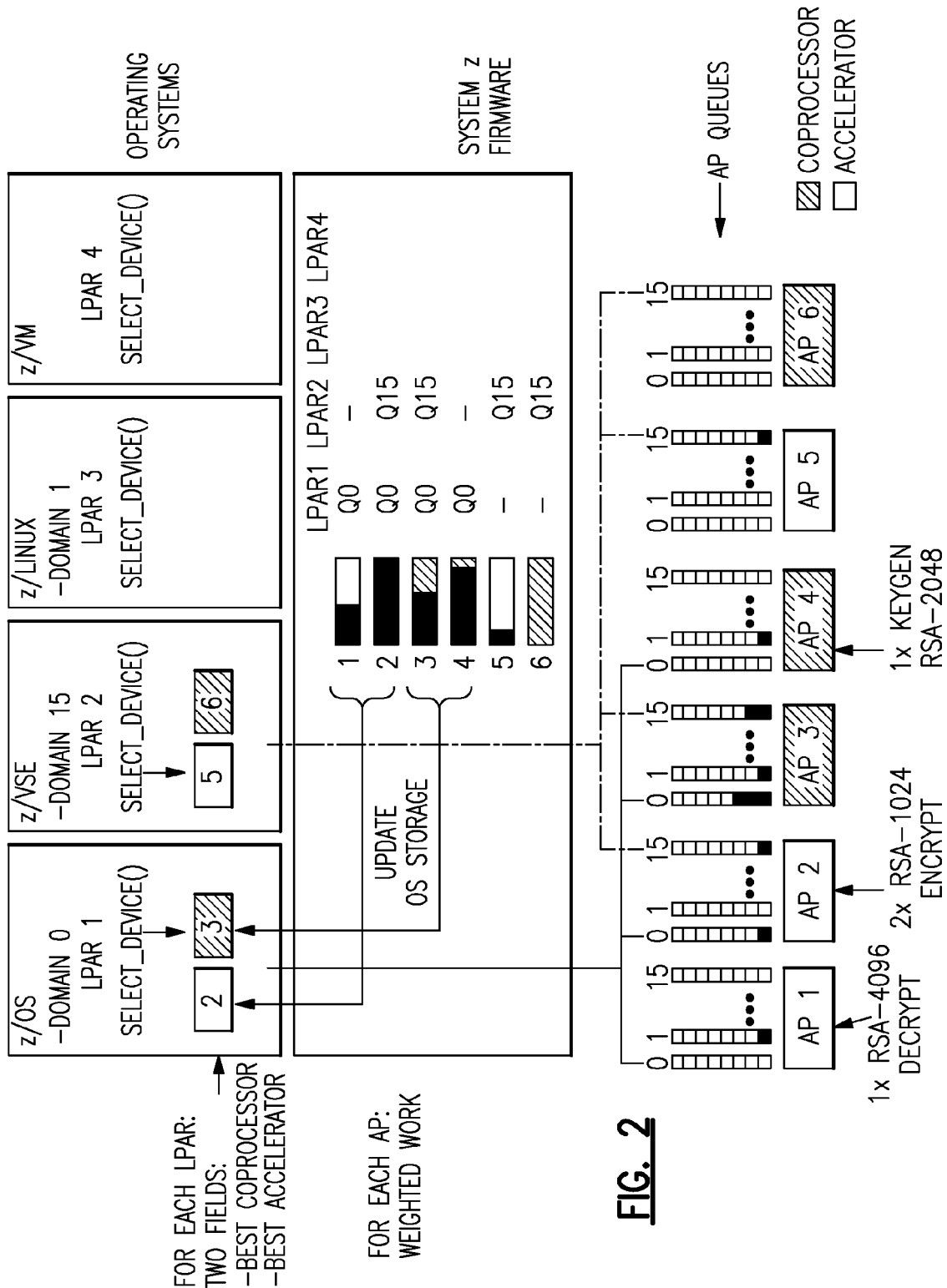
FIG. 2 illustrates an alternative of a computing environment according to the invention.

FIG. 2 shows an example with two kinds of devices for the processors or AP. The devices AP1, AP2 and AP5 are devices of the first kind, here accelerator, and the devices AP3, AP4 and AP6 are devices of the second kind, here coprocessor. Furthermore, within one kind of devices, all the processors may not be identical as it is in the example shown on FIG. 2 with AP1 and AP2. Accordingly, a different quality weight is affected to AP1 and AP2.

LPAR1 has two accelerators and two coprocessors assigned (full line). These four APs are in the AP group for LPAR1. AP1 processes one RSA-4096 request, which has a higher weight than two RSA-1024 requests being processed by AP2. AP3 and AP4 are coprocessors. AP4 processes one keygen, which has a higher weight than four RSA-1024 requests being processed by AP3.

For calculating the best accelerator field for LPAR1,
determine accelerator AP with smallest weight within the AP group for LPAR1 (APs 1,2,3,4);
write AP number into best accelerator field.

Let's assume the following situation, based on FIG. 2. The z/OS operating system running in LPAR 1 wants to process an RSA-1024 encryption request. The request can be processed on APs 1, 2, 3, or 4. According to prior art, the fastest device available would be looked for which is capable of processing the given request. In the present example two accelerator cards (AP1 and 2) and two coprocessor cards (AP 3 and 4) are to be considered. Hence z/OS would decide to use either AP1 or 2. As z/OS has already enqueued a request to AP2 (via AP queue 0, which is assigned to LPAR 1), z/OS would now use AP1 and affected to it the new request. From a global perspective this choice is not optimal, because z/OS does not see that AP1 is already processing another request enqueued from another operating system via AP queue 1. In addition to that, in this example, AP1 processes a request which takes a lot more time to finish than AP2. So this example shows two weaknesses of this old algorithm.

When implementing the method of managing workload according to the present invention, the accumulated sum of weight values of all requests being processed by a given AP is first calculated. The individual weight values (quality weight) are based on the device speed and the calculation effort for the given request i.e. the specificity of that processor. In the example shown on FIG. 2, as a result APs 1 or 2 would be favoured against APs 3 or 4, but not only because they are accelerators, but because they have lower accumulated weight values. Finally z/OS would choose AP2, because the fact that AP1 is currently processing a very huge request (RSA-4096) leads to a lower weight value of AP2, although both APs are processing just one request.

Advantageously, the new method of managing workload of a computing environment makes the choice from a global perspective, considering device speed, request complexity, and all AP queues of all APs in the whole system. AP balancing does not influence currently implemented routines in the various operating systems. An operating system may still have the possibility to decide not to use AP balancing (workload manager according to the present invention) for any reason. Each operating system has only access to the list of "best devices" for their own LPAR. So it is not possible for one OS to identify the requests being processed in other LPARs.

Due to the fact that according to the invention the overall work on an AP is calculated by building the weighted sum over all AP queues of a given AP, the transparency of multiple domains is still guaranteed. Such an approach brings no disadvantage but only advantages on multiple crypto domains.

Compared to prior art process, AP balancing (workload manager according to the invention) has the following advantages.

The time needed to identify the device for a given request is not dependent on the number of assigned APs;
The algorithm considers the total activity on an AP, not only the requests sent from one LPAR. Each algorithm performed in an isolated LPAR could only be sub-optimal;
All existing operating systems (e.g. z/OS, z/VSE, z/VM, Linux on System z) can take advantage of the new algorithm;
The advantage against the prior art method gets even bigger when the number of different request types (e.g. RSA encrypt, RSA decrypt, key generation, . . . ) and lengths increases (e.g. 1024, 2048, 4096, . . . ).

An implementation of a computer program product according to the invention may imply that the OS passes the address of two Integer fields to preferably the firmware at Initial Program Load time or at the time the OS does a sensing of its configuration. As an alternative, the OS could query the currently "best APs" via some specific routine.

Some function codes could be further implemented to enable and disable the new method for managing workload. Disabling the new method could make sense for performance measurements. When AP balancing is disabled, the two Integer fields would contain a reserved value (e.g. an invalid AP number >63).

An implementation of the method according to the invention could be based on the following algorithm depending on whether AP balancing is active. The algorithm could consist of two parts:
1. Calculate the individual AP weights.
2. Update OS storage with best AP number.

It follows a general algorithm to be used to implement an embodiment according to the invention.

If the request is processed synchronously, we will return to the caller when step 3 is finished:

1. On process request:
    update internal AP Workload list;
    for i=0 to max LPAR (using crypto)
        determine best coprocessor/accelerator;
        update OS storage;
    End
2. Process the request (takes some time, in which other applications may also try to access this device)
3. On return to caller:
    update internal AP Workload list;
    for i=0 to max LPAR (using crypto)
        determine best coprocessor/accelerator;
        update OS storage;
    End If the request is processed asynchronously, we will return to the caller after step 1 is finished. The caller either uses a polling mechanism to check for the reply in certain time intervals or gets prompted when the reply is available. Polling or prompting is not part of this invention disclosure:

1. On start process:
    update internal AP Workload list;
    for i=0 to max LPAR (using crypto)
        determine best coprocessor/accelerator;
        update OS storage;
    End
2. Process request
3. On process finished:
    update internal AP Workload list;
    for i=0 to max LPAR (using crypto)
        determine best coprocessor/accelerator;
        update OS storage;
    End The routine to update the internal workload list builds the sum of all request weights for each device according to Equation 1 and the given static device dependent request weights shown in Table 1. Let's assume that all accelerators are CEX2A cards and coprocessors are CEX2C cards.

$$\text{AP\_weight} = \sum_{i=0\ldots15} \left( \sum_{k=0\ldots7} (\text{req\_weight}_{i,k}) \right)$$

This sum is built over all assigned AP numbers (first index 0 . . . 15) and their input queue elements (second index 0 . . . 7, because each queue can hold up to 8 enqueued elements). So the AP weights are calculated like:

$$\text{AP\_weight for AP1} = \text{req\_weight}(\text{CEX2A}, \text{RSA-4096 decrypt})$$
$$= 30$$
$$\text{AP\_weight for AP2} = 2 * \text{req\_weight}(\text{CEX2A}, \text{RSA-1024 encrypt})$$
$$= 2 * 4$$
$$= 8$$

In FIG. 2, AP 3 has a total of 6 requests enqueued. Let's assume that they are 3 RSA-2048 decrypt operations, one RSA-1024 encryption, and two RSA-2048 encryptions. It's not relevant how these requests are distributed over the AP input queues. Then the AP weight for AP3 calculates like:

$$\text{AP\_weight for AP3} = 3 * \text{req\_weight}(\text{CEX2C}, \text{RSA-2048 decrypt})$$
$$+ 1 * \text{req\_weight}(\text{CEX2C}, \text{RSA-1024 encrypt})$$
$$+ 2 * \text{req\_weight}(\text{CEX2C}, \text{RSA-2048 encrpyt})$$
$$= 3 * 36$$
$$+ 1 * 12$$
$$+ 2 * 24$$
$$= 168$$

AP4 has just one request in process. However, this is a long running key generation which results in a big AP weight according to Table 1.

AP_weight for AP4 = req_weight(CEX2C, Keygen RSA-2048)

= 600

According to the above calculations, the AP weights within the AP group for LPAR1 are:

| | |
|---|---|
| AP1 | 30 |
| AP2 | 8 |
| AP3 | 168 |
| AP4 | 600 |

Thus, in this example, AP2 has the lowest AP weight within the AP group of LPAR1 and is taken for processing the next request from LPAR1. The algorithm can be expressed like:

for i=0 to max AP within AP group
    determine minimum AP weight
update OS storage with AP number of AP with minimum weight When all AP queues of all APs are full, there is no "best AP". In this case, the two OS fields for "best accelerator" and "best coprocessor" could be flagged as unusable (e.g. assign a reserved AP number, 99, −1, etc.). Then the OS would return to the caller with a bad return code. Also, a third field could be used to indicate the validity of the two fields.

The main advantages of the present inventions are that the managing workload of the computing environment according to the invention handles distributed knowledge. Therefore Operating Systems can decide which AP to use based on whether the request is a specific request to be processed only by some specific processor e.g. here secure key (target is a specific AP, which contains secret key—this information is only known by the Operating System) or clear key (any available AP can be used, depending on request type).

The firmware proposes the best AP (e.g. here Coprocessor and Accelerator) for each given LPAR configuration enabled for AP balancing.

Such a management of workload is not just load balancing since

The present method considers different request types of functions/operations (different functions and key lengths) i.e. behaves context-sensitive.

It considers different types of resources (e.g. here crypto cards).

It makes a prediction about the future utilization of a particular device based on the AP weight.

Furthermore, it is open for dynamic configuration changes (e.g. dynamic addition of crypto devices to an LPAR). It is also open for future extensions (new crypto devices supporting new cryptographic functions and key lengths).

The invention claimed is:

1. A method of managing workload across one or more partitions of a plurality of partitions of a computing environment, the method comprising:
identifying one or more processors in a partition to be managed by a quality weight defined according to characteristics of each corresponding processor;
measuring a load of each identified processor depending on the requests already allocated to be processed by each corresponding processor;
determining for each identified processor a performance factor based on the measured load and the quality weight, wherein the performance factor is a measurement of processor load;
identifying a new request to be allocated to the partition;
selecting a processor from the partition with the lowest performance factor; and
allocating the new request to the selected processor, the allocating comprising checking compatibility of the new request and the selected processor according to pre-defined rules of the request and processor flags.

2. The method according to claim 1, wherein the new request comprises an individual static weight corresponding to an estimated amount of processor time required for the new request.

3. The method according to claim 1, wherein the quality weight is based on processor speed.

4. The method according to claim 1, wherein the quality weight and the new request are associated with a processor flag and a request flag based on the selected processor.

5. The method according to claim 1, wherein measuring a load for the different processors further comprises considering a specific static weight for the already allocated requests, wherein the static weight expresses an operation time of a corresponding processor required to fulfill the already allocated requests.

6. The method according to claim 1, wherein the requests already allocated comprises requests from one or more partitions.

7. A computer program product for managing workload across one or more partitions of a plurality of partitions of a computer environment, the computer program product comprising:
a non-transitory computer readable medium having computer usable program code embodied therewith, the computer usable program code comprising:
computer usable program code configured to identify one or more processors in a partition to be managed by a quality weight defined according to their characteristics;
measure a load of each identified processor depending on the requests already allocated to be processed by corresponding processor;
determine for each identified processor a performance factor based on the measured load and the quality weight, wherein the performance factor is a measurement of processor load;
identify a new request to be allocated to the partition;
select a processor from the partition with the lowest performance factor; and
allocate the new request to the selected processor, the allocate comprising checking the compatibility of the new request and the selected processor according to pre-defined rules of the request and processor flags.

8. The computer program product according to claim 7, wherein the new request comprises an individual static weight corresponding to an estimated amount of processor time required to process the new request.

9. The computer program product according to claim 7 wherein the quality weight is based on processor speed.

10. The computer program product according to claim 7, wherein the quality weight and the new request are associated with a processor flag based on the selected processor.

11. The computer program product according to claim 7, wherein the computer usable program code configured to measure a load of the different processors further comprises considering a specific static weight for the already allocated requests, wherein the static weight expresses an operation time of a corresponding processor required to fulfill the already allocated requests.

12. The computer program product according to claim 7, wherein the computer usable program code is implemented within the computing environment as firmware.

13. A system of managing workload across one or more partitions of a plurality of partitions of a computing environment, the system comprising:
   a physical machine;
   one or more partitions each comprising one or more processors;
   wherein the system is capable of performing a method comprising:
     identifying one or more processors in a partition to be managed by a quality weight defined according to their characteristics;
     measuring a load of each identified processor depending on the requests already allocated to be processed by corresponding processor;
     determining for each identified processor a performance factor based on the measured load and the quality weight, wherein the performance factor is a measurement of processor load;
     identifying a new request to be allocated to the partition;
     selecting a processor from the partition with the lowest performance factor; and
     allocating the new request to the selected processor, the allocating comprising checking compatibility of the new request and the selected processor according to predefined rules of the request and processor flags.

14. The system according to claim 13, wherein the new request comprises an individual static weight corresponding to an estimated amount of processor time required for the new request.

15. The system according to claim 13, wherein the quality weight is based on processor speed.

16. The system according to claim 13, wherein the quality weight and the new request are associated with a processor flag and a request flag based on the selected processor.

17. The system according to claim 13, wherein measuring a load for the different processors further comprises considering a specific static weight for the already allocated requests, wherein the static weight expresses an operation time of a corresponding processor required to fulfill the already allocated requests.

* * * * *